United States Patent
Song et al.

(10) Patent No.: US 9,524,701 B2
(45) Date of Patent: Dec. 20, 2016

(54) DISPLAY APPARATUS AND METHOD FOR PROCESSING IMAGE THEREOF

(71) Applicant: SAMSUNG ELECTRONICS CO., LTD., Suwon-si (KR)

(72) Inventors: Ji-hye Song, Hwaseong-si (KR); Gyeong-cheol Jang, Suwon-si (KR); Jong-keun Cho, Ansan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 188 days.

(21) Appl. No.: 14/132,707

(22) Filed: Dec. 18, 2013

(65) Prior Publication Data
US 2014/0168252 A1 Jun. 19, 2014

Related U.S. Application Data

(60) Provisional application No. 61/738,699, filed on Dec. 18, 2012.

(51) Int. Cl.
| | | |
|---|---|---|
| G09G 5/00 | (2006.01) | |
| G09G 5/14 | (2006.01) | |
| G06T 11/60 | (2006.01) | |
| G06T 5/00 | (2006.01) | |
| G06F 3/048 | (2013.01) | |
| G06F 3/0346 | (2013.01) | |
| H04N 1/52 | (2006.01) | |
| H04N 1/40 | (2006.01) | |
| G09G 5/36 | (2006.01) | |

(52) U.S. Cl.
CPC ........ *G09G 5/36* (2013.01); *G09G 5/00* (2013.01); *G09G 5/006* (2013.01); *G09G 2340/14* (2013.01)

(58) Field of Classification Search
CPC combination set(s) only.
See application file for complete search history.

(56) References Cited

U.S. PATENT DOCUMENTS

| | | | |
|---|---|---|---|
| 5,598,359 A | * | 1/1997 | Montag .............. G06T 11/001 434/2 |
| 7,657,281 B2 | | 2/2010 | Eibye |
| 2005/0102104 A1 | * | 5/2005 | Parsons .............. G01S 7/003 702/3 |
| 2005/0179638 A1 | | 8/2005 | Seo et al. |

(Continued)

FOREIGN PATENT DOCUMENTS

| | | |
|---|---|---|
| JP | 2007-110394 A | 4/2007 |
| KR | 1020060013608 A | 2/2006 |

(Continued)

OTHER PUBLICATIONS

International Search Report for PCT/KR2013/011822 dated Apr. 14, 2014 [PCT/ISA/210].

(Continued)

*Primary Examiner* — Wesner Sajous
(74) *Attorney, Agent, or Firm* — Sughrue Mion, PLLC

(57) ABSTRACT

A display apparatus and an image processing method thereof are provided. The method includes displaying an image on a display screen, acquiring weather information through at least one of a sensor and an external server, and providing an image effect corresponding to the weather information to the displayed image by processing the image based on the acquired weather information.

26 Claims, 10 Drawing Sheets

(56) References Cited

U.S. PATENT DOCUMENTS

| | | | |
|---|---|---|---|
| 2006/0229810 A1 | 10/2006 | Cross et al. | |
| 2009/0186604 A1* | 7/2009 | Ruy | G06Q 10/10 |
| | | | 455/414.3 |
| 2009/0237371 A1 | 9/2009 | Kim et al. | |
| 2011/0059775 A1* | 3/2011 | Choi | G06F 1/1694 |
| | | | 455/566 |
| 2011/0169756 A1 | 7/2011 | Ogawa et al. | |
| 2012/0027254 A1* | 2/2012 | Shinoyama | G06T 11/60 |
| | | | 382/103 |
| 2012/0092347 A1 | 4/2012 | Du | |
| 2013/0268196 A1* | 10/2013 | Dam | G01W 1/00 |
| | | | 702/3 |

FOREIGN PATENT DOCUMENTS

| | | |
|---|---|---|
| KR | 10-2006-0092625 A | 8/2006 |
| KR | 100605892 B1 | 8/2006 |
| KR | 1020070082195 A | 8/2007 |
| KR | 101195472 B1 | 11/2012 |

OTHER PUBLICATIONS

Written Opinion for PCT/KR2013/011822 dated Apr. 14, 2014 [PCT/ISA/237].

Communication dated Aug. 18, 2015, issued by the United Kingdom Intellectual Property Office in counterpart UK Application No. GB1512517.2.

Communication dated Sep. 14, 2016, issued by the United Kingdom Intellectual Property Office in counterpart United Kingdom Application No. GB1512517.2.

* cited by examiner

DISPLAY APPARATUS AND METHOD FOR PROCESSING IMAGE THEREOF

CROSS-REFERENCE TO RELATED APPLICATION

This application claims priority from U.S. Provisional Application No. 61/738,699, filed on Dec. 18, 2012 in the United States Patent and Trademark Office, the disclosure of which is incorporated herein by reference in its entirety.

BACKGROUND

1. Field

Apparatuses and methods consistent with exemplary embodiments relate to a display apparatus and a method for processing an image thereof, and more particularly, to a display apparatus for providing an image effect corresponding to weather information to a display screen, and a method for processing an image thereof.

2. Description of the Related Art

In recent display apparatuses, a display screen may provide a variety of information. For example, portable display apparatuses, such as smart phones, may display a variety of information such as time information, communication status information, or battery information on an idle screen.

Further, recent display apparatuses may provide screens by reflecting weather information to the display screen. However, the display apparatuses in the related art store a plurality of images corresponding to a plurality of pieces of weather information, acquire weather information, and display an image corresponding to the acquired weather information. For example, when the weather is clear, the display apparatuses may provide an image including the sun, and when it is raining, the display apparatuses may provide a rain image.

When the image corresponding to the weather information among the plurality of images previously stored in a memory is selected and provided, an image effect according to a user input may not be provided, and when the plurality of images are stored, an amount of memory use may cause concern.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a display apparatus capable of providing an image effect corresponding to weather information to a currently displayed image, and a method for processing an image thereof.

According to an aspect of an exemplary embodiment, there is provided a method for processing an image of a display apparatus. The method may include: displaying an image on a display screen; acquiring weather information through at least one of a sensor and an external server; and providing an image effect corresponding to the weather information by processing the image based on the acquired weather information.

The weather information may include at least one of temperature information, humidity information, precipitation information, rainfall information, ultraviolet information, yellow dust information, fine dust information, atmospheric pressure information, wind speed information, and wind direction information.

The providing may include providing the image effect corresponding to the weather information by performing at least one of image deformation for controlling color and transparency of pixels of the image, image mixture for composing pixels of an overlapping portion between the image and an image corresponding to the weather information, and masking for performing different operations for the image according to regions, according to the acquired weather information.

The providing may include providing the image effect to the image by generating a smooth noise pattern as a temperature is increased, and providing the image effect to the image by generating a rough noise pattern and performing image mixture with a frost image when the temperature is reduced.

The providing may include providing the image effect to the image by providing a blurring effect of the image or by controlling a noise value, according to acquired humidity information.

The providing may include providing a damp image effect to the image by expanding a blurring application region and increasing the noise value as humidity is increased.

The method may further include providing the image effect corresponding to the acquired weather information to a location at which a touch of a user is input when the touch of the user is input to the display screen while the image effect is provided to the image.

The providing of the image effect corresponding to the acquired weather information to the location at which the touch of the user is input may include providing an image effect in which a water drop is formed at a location at which the touch of the user is completed, and the water drop is rolling down to a gravity direction measured in a gyro sensor.

The method may further include removing the image effect provided at the location at which the touch of the user is input when voice of the user having a preset frequency is input through a microphone while the image effect corresponding to the acquired weather information is provided to the location at which the touch of the user is input.

The method may further include changing the image effect to an image effect corresponding to changed weather information when the weather information is changed while the image effect is provided.

According to an aspect of another exemplary embodiment, there is provided a display apparatus. The display apparatus may include: a display configured to display an image on a display screen; a sensor configured to acquire weather information; a communicator configured to communicate with an external server; and a controller configured to acquire weather information through at least one of the external server and the sensor, process the image based on the acquired weather information, and provide an image effect corresponding to the weather information.

The weather information may include at least one of temperature information, humidity information, precipitation information, rainfall information, ultraviolet information, yellow dust information, fine dust information, atmospheric pressure information, wind speed information, and wind direction information.

The controller may provide the image effect corresponding to the weather information by performing at least one of image deformation for controlling color and transparency of pixels of the image, image mixture for composing pixels of an overlapping portion between the image and an image corresponding to the weather information, and masking for performing different operations for the image according to regions, according to the acquired weather information.

The controller may provide the image effect to the image by generating a smooth noise pattern as a temperature is increased, and provide the image effect to the image by generating a rough noise pattern and performing image mixture with a frost image when the temperature is reduced.

The controller may provide the image effect to the image by providing a blurring effect of the image or by controlling a noise value, according to acquired humidity information.

The controller may provide a damp image effect to the image by expanding a blurring application region and increasing the noise value as humidity is increased.

The display apparatus may further include a touch input unit configured to receive a touch of a user, and the controller may provide the image effect corresponding to the acquired weather information to a location at which the touch of the user is input when the touch of the user is input to the display screen through the touch input unit while the image effect is provided to the image.

The controller may provide an image effect in which a water drop is formed at a location at which the touch of the user is completed, and the water drop is rolling down to a gravity direction measured in a gyro sensor.

The display apparatus may further include a microphone configured to receive voice of a user, and the controller may remove the image effect provided at the location at which the touch of the user is input when the voice of the user having a preset frequency is input through the microphone while the image effect corresponding to the acquired weather information is provided to the location at which the touch of the user is input.

The controller may change the image effect to an image effect corresponding to changed weather information when the weather information is changed while the image effect is provided.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF EXEMPLARY EMBODIMENTS

Figure 1:
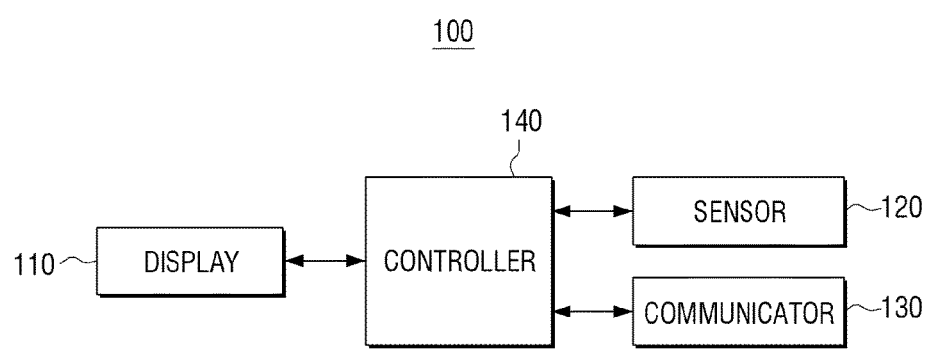
FIG. 1 is a schematic block diagram illustrating a configuration of a display apparatus according to an exemplary embodiment.

Hereinafter, exemplary embodiments will be described in more detail with reference to the accompanying drawings.

In the following description, the same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a schematic block diagram illustrating a configuration of a display apparatus 100 according to an exemplary embodiment. As illustrated in FIG. 1, the display apparatus 100 includes a display 110, a sensor 120, a communicator 130, and a controller 140. The display apparatus 100 may be implemented in various display apparatuses such as a smart phone, a tablet personal computer (PC), a laptop PC, a desktop PC, or a television.

The display 110 displays an image according to control of the controller 140. In particular, the display 110 may display the image to which an image effect is provided according to weather information.

The sensor 120 acquires weather information. The sensor 120 may include a temperature sensor configured to acquire temperature information, and a humidity sensor configured to acquire humidity information. However, it is merely exemplary that the sensor 120 includes the temperature sensor and the humidity sensor, and other sensors configured to other weather information may be included.

The communicator 130 performs communication with an external server. In particular, the communicator 130 may acquire weather information from the external server (for example, a server of a meteorological office, or the like).

The controller 140 controls an overall operation of the display apparatus 100. In particular, the controller 140 may acquire weather information through the sensor 120 and/or the communicator 130, process a currently displayed image based on the acquired weather information, and control the display to provide an image effect corresponding to the weather information. At this time, the weather information may include at least one of temperature information, humidity information, precipitation information, rainfall information, ultraviolet information, yellow dust information, fine dust information, atmospheric pressure information, wind speed information, and wind direction information.

Specifically, the controller 140 may acquire temperature information and humidity information through a temperature sensor and a humidity sensor. Further, the controller 140 may acquire the weather information from an external server through the communicator 130 at preset times or time intervals.

When the weather information is acquired, the controller 140 determines an image processing method and an image processing amount using the acquired weather information. The image processing method may include image deformation using a filter, image mixture with another image, masking, or the like. In particular, when the temperature information is acquired, the controller 140 may determine an image processing method for controlling a noise generation pattern of the image or performing image mixture with a preset image, according to the acquired temperature information. Specifically, the controller 140 may generate a smooth noise pattern as a temperature is increased, and generate a rough noise pattern and perform image mixture with a frost image when the temperature is reduced. Further, when the humidity information is acquired, the controller 140 may provide a blurring effect of the image or control a noise value, according to the acquired humidity information. Specifically, the controller 140 may expand a blurring application region and increase the noise value, when humidity is increased.

The controller 140 may provide an image effect corresponding to the weather information by processing the currently displayed image according to the determined image processing method and image processing amount. Specifically, the controller 140 may provide a damp image effect to the currently displayed image according to currently determined humidity. Further, the controller 140 may provide an image effect in which roughness of the currently displayed image is controlled according to currently determined temperature information.

When a touch of a user is input to the display screen while the image effect is provided to the image, the controller 140 may provide the image effect corresponding to the acquired weather information at a location on the display screen which the touch of the user is input. For example, when the touch of the user is input to the display screen while the damp image effect is provided to the image, the controller 140 may remove humidity at the location at which the touch of the user is input. When a temperature is high, the controller 140 may provide a water drop image effect at the location from which the humidity is removed. When the temperature is low, the controller 140 may provide a frost image effect to the location from which the humidity is removed.

The controller 140 may provide an image effect in which a water drop forms at a location in which the touch of the user is completed, and the water drop is rolling down in a gravity direction measured in a gyro sensor.

Further, when a voice or breath of the user having a preset frequency is input through a microphone while the image effect corresponding to the acquired weather information is provided to the location at which the touch of the user is input, the controller 140 may remove the image effect provided at the location at which the touch of the user is input. That is, when the humidity is removed at the location in which the touch of the user is input, the controller 140 may provide an image effect by generating humidity at the location at which the touch of the user is input again when the breath of the user is input.

When the weather information is changed while the image effect is provided, the controller 140 may change the image effect to an image corresponding to the changed weather information.

Through the display apparatus 100 as described above, the user may acquire current weather information through the currently displayed image, and an entertaining factor may also be increased.

Figure 2:
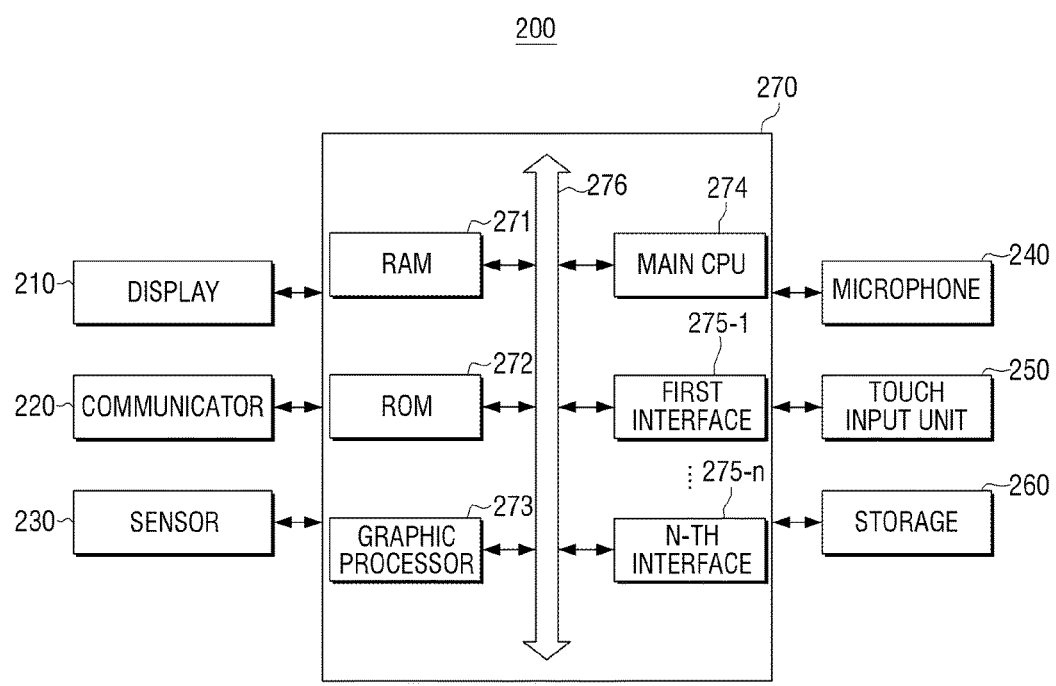
FIG. 2 is a detailed block diagram illustrating a configuration of a display apparatus according to an exemplary embodiment.

Hereinafter, a display apparatus according to an exemplary embodiment will be described in detail with reference to FIGS. 2 to 6. FIG. 2 is a detailed block diagram illustrating a configuration of a display apparatus 200 according to an exemplary embodiment. As illustrated in FIG. 2, the display apparatus 200 includes a display 210, a communicator 220, a sensor 230, a microphone 240, a touch input unit 250, a storage 260, and a controller 270.

The display 210 displays image data according to control of the controller 270. In particular, the display 210 may display an image to which an image effect is provided according to weather information. At this time, the image to which the image effect is provided may be an idle screen.

The communicator 220 is a unit configured to perform communication with various types of external servers according to various types of communication methods. The communicator 220 may include various communication chips such as a wireless fidelity (WiFi) chip, a Bluetooth chip, a near field communication (NFC) chip, or a wireless communication chip. The WiFi chip, the Bluetooth chip, and the NFC chip perform communication in a WiFi manner, a Bluetooth manner, and a NFC manner, respectively. The NFC chip is a chip configured to operate in the NFC manner using a band of 13.56 MHz among various radio frequency identification (RFID) frequency bands such as 135 kHz, 13.56 MHz, 433 MHz, 860 to 960 MHz, and 2.45 GHz. When the WiFi chip or the Bluetooth chip is used, the communicator 220 may first transmit/receive a variety of connection information such as a service set identifier (SSID) and a session key, connect communication using the information, and transmit/receive a variety of information. The wireless communication chip is a chip configured to perform communication according to various communication standards, such as Institute of Electrical and Electronics Engineers (IEEE), Zigbee, 3rd generation (3G), 3rd Generation Partnership Project (3GPP), or Long Term Evolution (LTE).

The communicator 220 may acquire weather information from various external sources. Specifically, the communicator 220 may receive weather information from an external server (for example, a server of a meteorological office, a portal server, a server of a telecommunication company, or the like).

The sensor 230 acquires weather information using various sensor modules. Specifically, the sensor 230 may acquire temperature information using a temperature sensor, and humidity information using a humidity sensor. It is merely exemplary that the sensor 230 includes the temperature sensor and the humidity sensor, and the sensor 230 may acquire weather information using other sensors.

The microphone 240 receives voice of the user. In particular, the microphone 240 may receive breath of a user having a preset frequency.

The touch input unit 250 receives a touch of the user for controlling the display apparatus 200. In particular, the touch input unit 250 may receive the touch of the user for providing an image effect corresponding to the weather information.

The storage 260 stores various modules configured to drive the display apparatus 200. For example, software including a base module, a sensing module, a communication module, a presentation module, a web browser module, and a service module may be stored in the storage 260. At this time, the base module is a basic module configured to process signals transmitted from hardware included in the display apparatus 200 and transmit the processed signals to an upper layer module. The sensing module is a module configured to collect information from various sensors, and analyze and manage the collected information. The sensing module may include a face recognition module, a voice recognition module, a motion recognition module, a NFC recognition module, and the like. The presentation module is a module configured to construct the display screen. The presentation module includes a multimedia module configured to reproduce and output multimedia content, and a user interface (UI) rendering module configured to perform UI and graphic processing. The communication module is a module configured to perform communication with the outside. The web browser module is a module configured to perform web browsing to access a web server. The service module is a module including various applications for providing a variety of service.

As described above, the storage 260 may store various program modules, but portions of the various program modules may be omitted or modified according to a kind and a characteristic of the display apparatus 200, or other program modules may be added. For example, when the display apparatus 200 is implemented in a smart phone, the base module may further include a location determination module configured to determine a global positioning system (GPS)-based location, and the sensing module may further include a sensing module configured to sense a motion of the user.

The controller 270 controls an overall operation of the display apparatus 200 using various programs stored in the storage 260.

As illustrated in FIG. 2, the controller 270 includes a random access memory (RAM) 271, a read only memory (ROM) 272, a graphic processor 273, a main central processing unit (CPU) 274, first to n-th interfaces 275-1 to 275-n, and a bus 276. At this time, the RAM 271, the ROM 272, the graphic processor 273, the main CPU 274, the first to n-th interfaces 275-1 to 275-n, and the like may be electrically coupled to each other through the bus 276.

A command set, and the like for system booting is stored in the ROM 272. When a turn-on command is input to supply power, the main CPU 274 copies an operating system (O/S) stored in the storage 260 to the RAM 271 according to a command stored in the ROM 272, and executes the O/S to boot a system. When the booting is completed, the main CPU 274 copies various application programs stored in the storage 260 to the RAM 271, and executes the application programs copied to the RAM 271 to perform various operations.

The graphic processor 273 generates a screen including various objects such as a pointer, an icon, an image, text, and the like using an operation unit (not shown) and a rendering unit (not shown). The operation unit calculates attribute values such as coordinate values in which the objects are displayed according to a layout of the screen, shapes, sizes, and colors using a control command received from an input unit. The rendering unit generates screens having various layouts including the objects based on the attribute values calculated in the operation unit. The screen generated in the rendering unit is displayed in a display area of the display 210.

The main CPU 274 accesses the storage 260 to perform booting using the O/S stored in the storage 260. The main CPU 274 performs various operations using various programs, content, data, and the like stored in the storage 260.

The first to n-th interfaces 275-1 to 275-n are coupled to the above-described components. One of the interfaces may be a network interface coupled to an external apparatus through a network.

In particular, the controller 270 acquires weather information through at least one of the sensor 230 and an external server, processes an image based on the acquired weather information, and provides an image effect corresponding to the weather information.

Specifically, the controller 270 displays an image. At this time, the image may be an idle screen, but the inventive concept is not limited thereto. For example, the image may be a background screen.

The controller 270 acquires the weather information from various sources. Specifically, the controller 270 may acquire temperature information and humidity information of a region in which the display apparatus 200 is located using the temperature sensor and the humidity sensor included in the sensor 230. Further, the controller 270 may acquire the weather information from an external server. Specifically, the controller 270 may acquire information of the region in which the display apparatus 200 is located based on a GPS sensor, transmit the information to the external server, and acquire the information of the region in which the display apparatus 200 is located from the external server. At this time, the weather information may include precipitation information, rainfall information, ultraviolet information, yellow dust information, fine dust information, atmospheric pressure information, wind speed information, and wind direction information in addition to the temperature information and the humidity information.

The controller 270 determines an image processing method and an image processing amount according to the acquired weather information. The image processing method according to an exemplary embodiment may include image deformation, image mixture, masking, or the like. The image deformation is an image processing method which performs an operation for newly calculating color and transparency values of pixel units based on an input image, and may include blurring, noise, or the like. The image mixture is an image processing method which performs a specific operation for pixels of an overlapping portion between the image and one or more images, and determines final pixel values, and may include addition, subtraction, multiplication, or the like. The masking is an image processing method which sets a specific region in the image, and differentially applies different operation methods according to regions, and may include bitmap masking, vector masking, or the like.

Specifically, when the acquired weather information is temperature information, the controller 270 may determine a noise generation pattern and image mixture the image processing method. In particular, the controller 270 may generate a smooth noise pattern as a temperature is increased, and generate a rough noise pattern when the temperature is reduced. Further, when the temperature is below the freezing point, the controller 270 may perform with a frost image. When the temperature is reduced, the controller 270 may increase a weight to the frost image.

When the acquired weather information is humidity information, the controller 270 may determine blurring, noise value control, and image mixture as the image processing method. In particular, the controller 270 may expand a blurring application region, increase the noise value, and increase mixture frequency with a water drop image, as humidity is increased.

The above-described exemplary embodiment is mere exemplary, and the controller may determine the image processing method and image processing amount based on other weather information. For example, when yellow dust information is received, the controller 270 may increase a noise value according to an amount of the yellow dust, and may first perform image mixture with a dust image.

Figure 3:
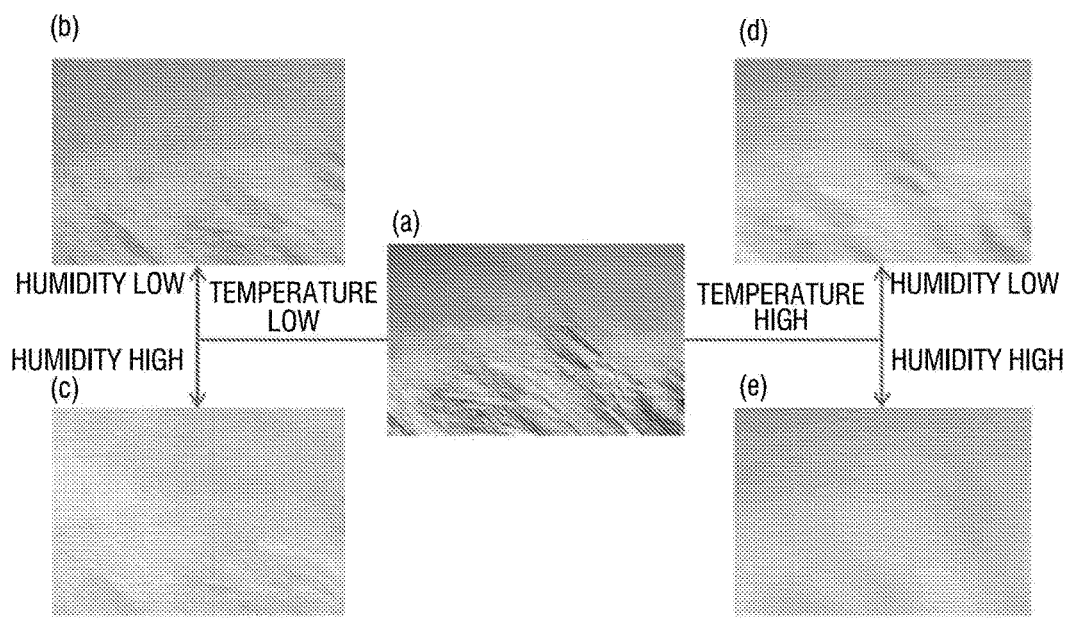
FIG. 3 is views illustrating an example in which an image effect is provided to a currently displayed image according to a temperature and humidity according to an exemplary embodiment.

Referring to FIG. 3, the controller 270 may provide the image effect by processing a currently displayed image based on the determined image processing method and image processing amount. Specifically, as shown in FIG. 3, when it is determined that temperature is low and humidity is low while an image is displayed as illustrated in view (a), the controller 270 may process the image illustrated in view (a), and provide an image effect of cold weather with low humidity as illustrated in view (b). When it is determined that the temperature is low and the humidity is high while the image is displayed as illustrated in view (a), the controller 270 may process the image illustrated in view (a), and provide an image effect of cold weather with high humidity as illustrated in view (c). When it is determined that the temperature is high and the humidity is low while the image is displayed as illustrated in view (a), the controller 270 may process the image illustrated in view (a), and provide an image effect of hot weather with low humidity as illustrated in view (d). When it is determined that the temperature is high and the humidity is high while the image is displayed as illustrated in view (a), the controller 270 may process the image illustrated in view (a), and provide an image effect of hot weather with high humidity as illustrated in view (e).

That is, the controller 270 may process the image through different methods according to the acquired weather information, and provide the image effects corresponding to the weather information as illustrated in views (b) to (e) of FIG. 3.

Further, when a touch of the user is input to the display screen through the touch input unit 250 while the image effect is provided to the currently displayed image, the controller 270 may provide the image effect corresponding to the acquired weather information to a location at which the touch of the user is input.

Specifically, when the touch of the user is input through the touch input unit 250 while the image effect of high temperature with high humidity as illustrated in view (e) is provided to the currently displayed image, the controller 270 may perform a differential application of a pixel operation by applying a region to which the touch of the user is input as a masking region. Accordingly, the controller 270 may remove humidity from a damp window by the touch of the user, and provide the graffiti-like image effect as illustrated in FIG. 4A.

Figure 4A:
FIGS. 4A and 4B are views illustrating an example in which an image effect corresponding to a touch of a user is provided when a temperature and humidity are high according to an exemplary embodiment.
Figure 4B:
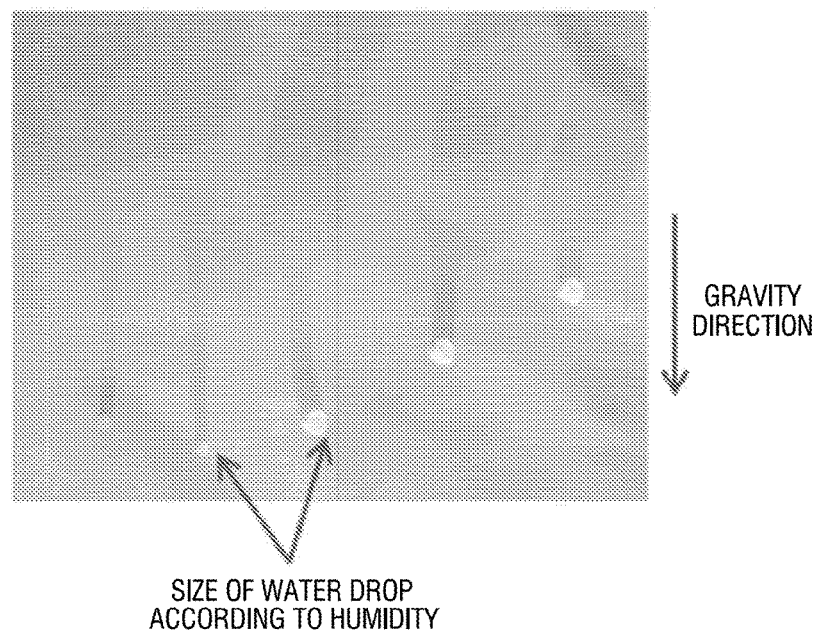

As illustrated in FIG. 4B, the controller 270 may perform image mixture with a water drop(s) image at a location at which the touch of the user is completed, and provide an image effect in which water drops are rolling down to a gravity direction measured in a gyro sensor. At this time, the controller 270 may control a size of the water drop(s) according to a humidity value. That is, when the humidity value is high, the controller 270 may increase the size of the water drop(s), and when the humidity value is low, the controller 270 may reduce the size of the water drop(s).

Figure 5:
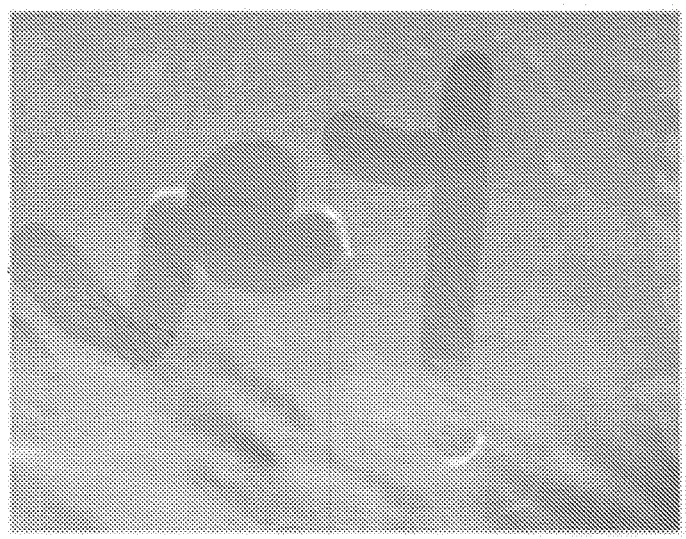
FIG. 5 is a view illustrating an example in which an image effect corresponding to a touch of a user is provided when a temperature is low and humidity is high according to another exemplary embodiment.

As another example, when a touch of the user is input through the touch input unit 250 while an image effect of cold weather with high humidity is provided to the currently displayed image as illustrated in view (c) of FIG. 3, the controller 270 may perform a differential application of a pixel operation by applying a region to which the touch of the user is input as a masking region. Therefore, the controller 270 may provide remove the humidity from a damp window by the touch of the user, and provide a graffiti-like image effect. At this time, as illustrated in FIG. 5, the controller 270 may perform image mixture with a frost image at a location at which the touch of the user is completed.

Figure 6:
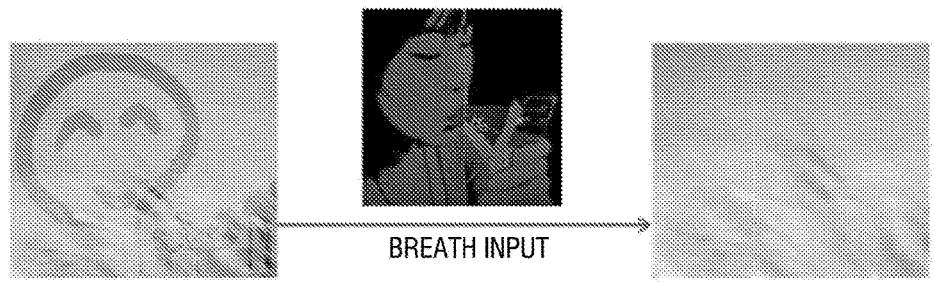
FIG. 6 is views illustrating an example in which an image effect corresponding to a touch of a user is removed according to breath of a user according to an exemplary embodiment.

Further, when voice of the user (for example, breath of the user, or the like) having a preset specific frequency through a microphone 240 while the graffiti-lime image effect is provided to a currently displayed image due to the touch of the user as illustrated in FIG. 4A, the controller 270 may provide an image effect in which the user actually breaths by controlling blurring application intensity and a degree of an operation differential application to a masking region according to the voice of the user as illustrated in FIG. 6.

Further, when the weather information is changed while an image effect as illustrated in FIGS. 3, 4A and 4B, 5, and 6, the controller 270 may change the image effect to an image effect corresponding to the changed weather information. For example, when it is determined from the acquired weather information that humidity is reduced while the image effect as illustrated in view (e) of FIG. 3 is provided, the controller 270 may change the currently provided image effect to the image effect as illustrated in view (d) of FIG. 3.

Various image effects and various user interactions may be provided according to surrounding weather information through the display apparatus 200 as described above.

In above-described embodiments, the weather information is acquired at preset times or preset time intervals, but this is merely exemplary, and the weather information may be acquired when other events are generated, for example, when a region in which the display apparatus 200 is located is changed.

Further, in the above-described embodiments, the image effect is provided according to humidity information and temperature information, but this is merely exemplary, and the image effect may be provided by processing an image based on other weather information (for example, yellow dust information, atmospheric pressure information, or the like).

Figure 7:
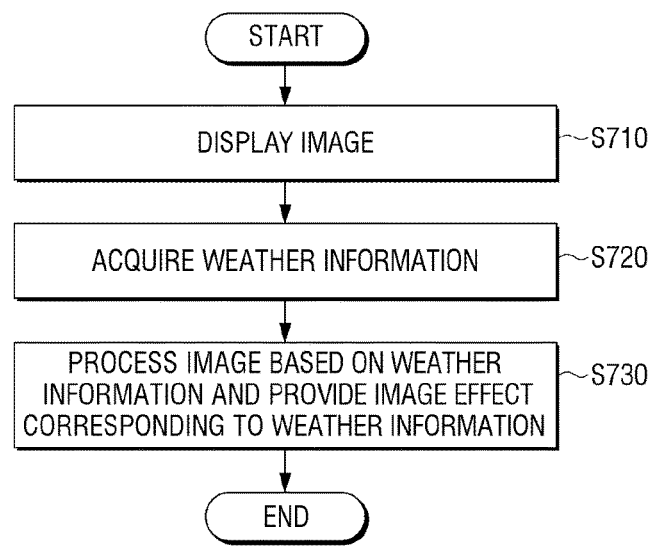
FIGS. 7 and 8 are flowcharts illustrating image processing methods according to an exemplary embodiment.

Hereinafter, image processing methods according to weather information will be described with reference to FIGS. 7 and 8. FIG. 7 is a schematic flowchart illustrating an image processing method of the display apparatus 100 according to an exemplary embodiment.

First, the display apparatus 100 displays an image (S710). At this time, the display apparatus 100 may be an idle screen, but the inventive concept is not limited thereto.

The display apparatus 100 acquires weather information (S720). Specifically, the display apparatus 100 may acquire the weather information from the sensor 120 and/or from various sources through the communicator 130. The weather information may include at least one of temperature information, humidity information, precipitation information, rainfall information, ultraviolet information, yellow dust information, fine dust information, atmospheric pressure information, wind speed information, and wind direction information.

The display apparatus 100 processes the image based on the acquired weather information and provides an image effect corresponding to the weather information (S730). Specifically, the display apparatus 100 may determine an image processing method and an image processing amount based on the acquired weather information, process the currently displayed image according to the determined image processing method and image processing amount, and provide the image effect corresponding to the weather information as illustrated in views (b) to (e) of FIG. 3.

Figure 8:
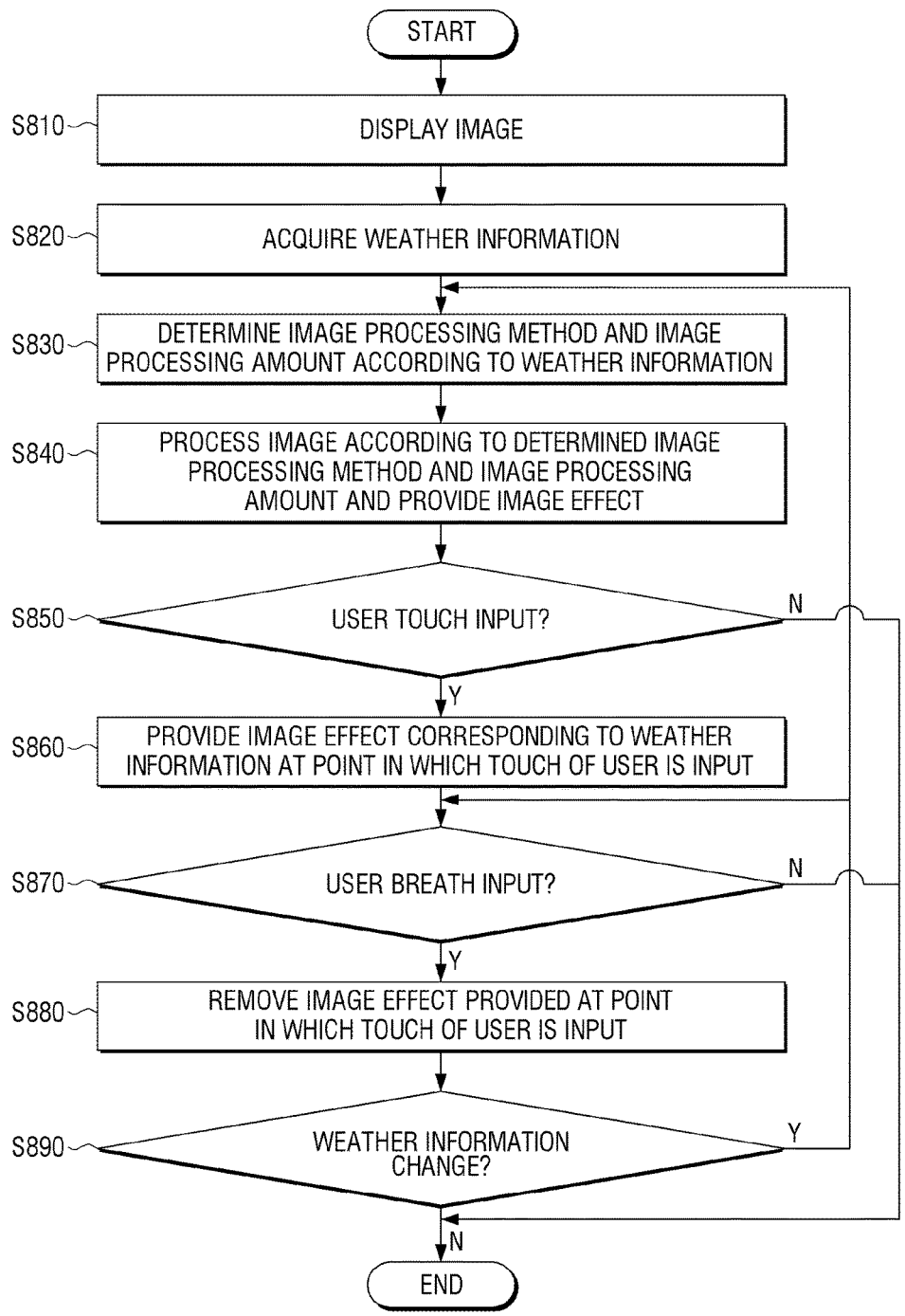

FIG. 8 is a detailed flowchart illustrating an image processing method of the display apparatus 200 in according to an exemplary embodiment.

First, the display apparatus 200 displays an image (S810). At this time, the displayed image may be an idle screen.

The display apparatus 200 acquires weather information (S820). Specifically, the display apparatus 200 may acquire the weather information through at least one image sensor and an external server.

The display apparatus 200 determines an image processing method and an image processing amount based on the weather information (S830). Specifically, when the acquired weather information is temperature information, the display apparatus 200 may determine a noise generation pattern and image mixture as the image processing method, and when the acquired weather information is humidity information, the display apparatus 200 may determine blurring, noise value control, and image mixture as the image processing method.

The display apparatus 200 performs image processing to the currently displayed image according to the determined image processing method and image processing amount, and provide an image effect corresponding to the weather information (S840). Specifically, the display apparatus 200 may provide the image effect corresponding to the weather information as illustrated in views (b) to (e) of FIG. 3 based on the acquired temperature information and humidity information.

The display apparatus 200 determines whether a touch of a user is input (S850).

When the touch of the user is input (S850—Y), the display apparatus 200 provides the image effect corresponding to the weather information to a location at which the touch of the user is input (S860). Specifically, the display apparatus 200 may provide the image effect corresponding to the weather information to the location at which the touch of the user is input as illustrated in FIGS. 4A and 5.

The display apparatus 200 determines whether breath of the user is input through the microphone 240 (S870).

When the breath of the user is input (S870—Y), the display apparatus 200 removes the image effect provided at the location at which the touch of the user is input (S880). Specifically, the display apparatus 200 may provide the humidity-removed image effect to the location at which the touch of the user is input as illustrated in FIG. 6.

The display apparatus 200 determines whether the weather information is changed (S890). When the weather information is changed (S890—Y), the display apparatus 200 may return to operation S830, and provide an image effect corresponding to the changed weather information to the currently displayed image again.

Through the above-described image processing methods, the user may intuitively confirm weather information through a currently displayed image, and an entertaining factor according to a user interaction may be increased.

Figure 9:
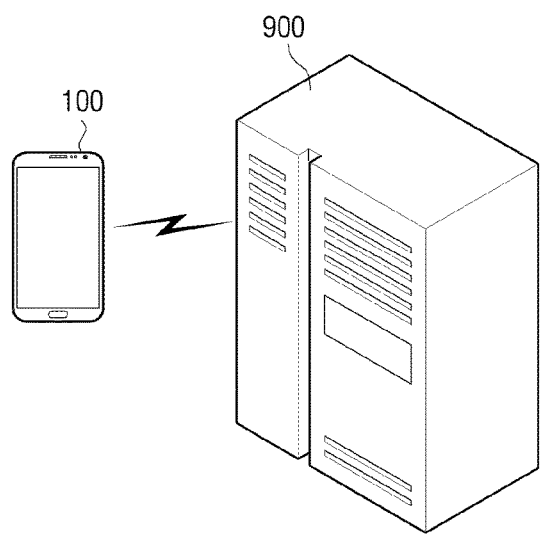
FIG. 9 is a view illustrating a system which provides an image effect to a display screen by acquiring weather information according to an exemplary embodiment.

FIG. 9 is a view illustrating a system configured to acquire weather information and provide an image effect to a display screen according to an exemplary embodiment. A system configured to provide an image effect corresponding to weather information includes a display apparatus 100 and an external server 900. The external server 900 may be a server of a meteorological office, but the inventive concept is not limited thereto.

The display apparatus 100 may transmit a signal requiring current weather information and an information for a region in which the display apparatus 100 is currently located to the external server 900.

The external server 900 may transmit the weather information for the region in which the display apparatus 100 is currently located to the display apparatus 100.

Further, the external server 900 may determine the region in which the display apparatus 100 is located every preset period and provide the weather information to the display apparatus 100.

The image processing methods of a display apparatus according to the above-described various exemplary embodiments may be implemented with a program and provided to display apparatuses or input apparatuses. In particular, the program including the control method of a display apparatus may be stored a non-transitory computer-recordable medium, and provided.

The non-transitory computer-recordable medium is an apparatus-readable medium configured to semi-permanently store data. Specifically, the above-described various applications or programs may be stored in the non-transitory apparatus-readable medium such as a compact disc (CD), a digital versatile disc (DVD), a hard disc, a Blu-ray disc, a universal serial bus (USB), a memory card, or a ROM, and provided.

The foregoing exemplary embodiments and advantages are merely exemplary and are not to be construed as limiting the present inventive concept. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. An image processing method comprising:
   displaying an image on a display screen;
   acquiring weather information through at least one of a sensor and an external server;
   providing a first image effect corresponding to the weather information to the displayed image based on the acquired weather information; and
   providing a second image effect corresponding to the acquired weather information to the displayed image at a location on the display screen at which a touch of a user is input while the first image effect is provided to the displayed image.

2. The method as claimed in claim 1, wherein the weather information comprises at least one of temperature information, humidity information, precipitation information, rainfall information, ultraviolet information, yellow dust information, fine dust information, atmospheric pressure information, wind speed information, and wind direction information.

3. The method as claimed in claim 1, wherein the providing the image effect comprises performing at least one of image deformation for controlling color and transparency of pixels of the image, image mixture for composing pixels of an overlapping portion between the image and an image corresponding to the weather information, and masking for performing different operations for the image according to regions, according to the acquired weather information.

4. The method as claimed in claim 3, wherein the providing the first image effect further comprises generating a smooth noise pattern when a temperature is increased, and generating a rough noise pattern and performing image mixture with a frost image when the temperature is reduced.

5. The method as claimed in claim 3, wherein the providing the first image effect further comprises providing a blurring effect to the displayed image or controlling a noise value, according to acquired humidity information.

6. The method as claimed in claim 5, wherein the providing the blurring effect comprises providing a damp image effect to the displayed image by expanding a blurring application region as humidity is increased, and
wherein the controlling the noise value comprises increasing the noise value as the humidity is increased.

7. The method as claimed in claim 1, wherein the second image effect is a water drop at a location at which the touch of the user is completed, and the water drop is rolling down in a gravity direction.

8. The method as claimed in claim 1, further comprising removing the first image effect when a voice of the user having a preset frequency is input through a microphone while the first image effect is provided to the displayed image.

9. The method as claimed in claim 1, further comprising changing the first image effect to third image effect corresponding to changed weather information when the weather information is changed.

10. A display apparatus comprising:
a display configured to display an image on a display screen;
a sensor configured to sense weather information;
a communicator configured to communicate with an external server;
a controller configured to acquire weather information through at least one of the external server and the sensor, and control the display to provide a first image effect corresponding to the received weather information to the displayed image based on the acquired weather information and
a touch input unit configured to receive a touch of a user,
wherein the controller is configured to control the display to provide a second image effect corresponding to the acquired weather information to the displayed image at a location of the display screen at which the touch of the user is input while the first image effect is provided to the displayed image.

11. The display apparatus as claimed in claim 10, wherein the weather information comprises at least one of temperature information, humidity information, precipitation information, rainfall information, ultraviolet information, yellow dust information, fine dust information, atmospheric pressure information, wind speed information, and wind direction information.

12. The display apparatus as claimed in claim 10, wherein the controller is configured to control the display to provide the first image effect to the displayed image by performing at least one of image deformation for controlling color and transparency of pixels of the image, image mixture for composing pixels of an overlapping portion between the image and an image corresponding to the weather information, and masking for performing different operations for the image according to regions, according to the acquired weather information.

13. The display apparatus as claimed in claim 12, wherein the controller is configured to control the display to provide the first image effect to the displayed image by generating a smooth noise pattern when a temperature is increased, and generating a rough noise pattern and performing image mixture with a frost image when the temperature is reduced.

14. The display apparatus as claimed in claim 12, wherein the controller is configured to control the display to provide the first image effect to the displayed image by providing a blurring effect to the displayed image or by controlling a noise value, according to acquired humidity information.

15. The display apparatus as claimed in claim 14, wherein the controller is configured to control the display to provide a damp image effect to the displayed image by expanding a blurring application region or increasing the noise value, as humidity is increased.

16. The display apparatus as claimed in claim 10, wherein the second image effect is a water drop formed at a location at which the touch of the user is completed, and the water drop is rolling down in a gravity direction.

17. The display apparatus as claimed in claim 10, further comprising a microphone configured to receive voice of a user,
wherein the controller is configured to control the display to remove the first image effect when the voice of the user having a preset frequency is input through the microphone while the first image effect is provided to the displayed image.

18. The display apparatus as claimed in claim 10, wherein the controller is configured to control the display to change the first image effect to a third image effect corresponding to changed weather information when the weather information is changed.

19. An image processing method comprising:
acquiring weather information;
processing an image to have a first image effect based on the acquired weather information; and
displaying the processed image having the first image effect on a display screen;
processing the processed image to have a second image effect corresponding to the acquired weather information at a location of the display screen at which a touch of a user is input while the processed image having the first image effect is displayed.

20. The image processing method of claim 19, wherein the acquiring the weather information comprises acquiring the weather information through at least one of a sensor and an external server.

21. The image processing method of claim 20, wherein the weather information comprises at least one of temperature information, humidity information, precipitation information, rainfall information, ultraviolet information, yellow dust information, fine dust information, atmospheric pressure information, wind speed information, and wind direction information.

22. The image processing method of claim 20, wherein the processing the image to have the first image effect comprises at least one of:
generating a smooth noise pattern when a temperature is increased;
generating a rough noise pattern and performing image mixture with a frost image when the temperature is reduced; and
providing a blurring effect to the image or controlling a noise value, according to acquired humidity information.

23. A display apparatus comprising:
a display configured to display an image on a display screen;
a controller configured to acquire weather information, process the image to have a first image effect based on the acquired weather information, and
control the display to display the processed image having the first image effect; and
a touch input unit configured to receive a touch of a user,
wherein the controller is configured to process the image to have a second image effect corresponding to the acquired weather information at a location of the display screen at which the touch of the user is input while the image having the first image effect is displayed.

24. The display apparatus of claim 23, further comprising:
a sensor configured to sense weather information; and
a communicator configured to communicate with an external server,
wherein the controller is configured to acquire the weather information through at least one of the external server and the sensor.

25. The display apparatus of claim 24, wherein the weather information comprises at least one of temperature information, humidity information, precipitation information, rainfall information, ultraviolet information, yellow dust information, fine dust information, atmospheric pressure information, wind speed information, and wind direction information.

26. The display apparatus of claim 24, wherein the controller is configured to process the image to have the first image effect by performing at least one of:
generating a smooth noise pattern when a temperature is increased;
generating a rough noise pattern and performing image mixture with a frost image when the temperature is reduced; and
providing a blurring effect to the image or controlling a noise value, according to acquired humidity information.

* * * * *